United States Patent
Wang

(10) Patent No.: US 8,309,933 B1
(45) Date of Patent: Nov. 13, 2012

(54) COUNT RATE ADAPTIVE FILTER FOR MEDICAL IMAGING SYSTEMS

(75) Inventor: Gin-Chung Wang, Grayslake, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/153,026

(22) Filed: Jun. 3, 2011

(51) Int. Cl.
 *G01T 1/24* (2006.01)
(52) U.S. Cl. ................... 250/370.01; 250/252.1
(58) Field of Classification Search ........... 250/252.1, 250/370.01
 See application file for complete search history.

(56) References Cited

U.S. PATENT DOCUMENTS

2011/0147597 A1* 6/2011 Nelson et al. ............ 250/370.01

OTHER PUBLICATIONS

Fabris, L. et al., "Simultaneous Ballistic Deficit Immunity and Resilience to Parallel Noise Sources: A New Pulse Shaping Technique," IEEE Transactions on Nuclear Science, vol. 48, Issue 3, Jun. 2001, pp. 450-454.

* cited by examiner

*Primary Examiner* — Mark R Gaworecki
(74) *Attorney, Agent, or Firm* — Oblon, Spivak, McClelland, Maier & Neustadt, L.L.P.

(57) ABSTRACT

Systems, devices, processes, and algorithms for adaptively filtering a signal output from a radiation detector and adaptively sampling the signal. A count rate of events detected by the radiation detector is estimated by a processing unit. An RC time constant of the filter and a sampling rate of an analog-to-digital converter are adjusted based on the estimated count rate. Events are continuously detected by the radiation detector and counted by the processing unit while the adjustable parameters (the RC time constant and the sampling rate) of the filter and the analog-to-digital converter are adjusted on the fly (in real time) to optimize an energy resolution of the detected events, while reducing degradation due to pile-up effects and improving efficiency of the analog-to-digital converter. The filter can be implemented through analog filters, digital filters, or a combination thereof.

23 Claims, 9 Drawing Sheets

Conventional Example

Conventional Example

US 8,309,933 B1

COUNT RATE ADAPTIVE FILTER FOR MEDICAL IMAGING SYSTEMS

FIELD

The embodiments described herein relate generally to devices, systems, algorithms, and processes for controlling a filter and an analog-to-digital converter utilized in radiation detection.

BACKGROUND

In positron emission tomography (PET) imaging, a radiopharmaceutical agent is administered, via injection, inhalation, and/or ingestion, to a patient. The physical and bio-molecular properties of the agent then concentrate at specific locations in the human body. The actual spatial distribution, intensity of the point and/or region of accumulation, as well as the kinetics of the process from administration and capture to eventual elimination, all have clinical significance. During this process, the positron emitter attached to the radiopharmaceutical agent emits positrons according to the physical properties of the isotope, such as half-life, branching ratio, etc.

Each positron interacts with an electron of the object, is annihilated and produces two gamma rays at 511 keV, which travel at substantially 180 degrees apart. The two gamma rays then cause a scintillation event at a scintillation crystal of the PET detector, which detects the gamma rays thereby. By detecting these two gamma rays, and drawing a line between their locations or "line-of-response," the likely location of the original annihilation is determined. While this process only identifies one line of possible interaction, accumulating a large number of these lines, and through a tomographic reconstruction process, the original distribution is estimated with useful accuracy. In addition to the location of the two scintillation events, if accurate timing—within a few hundred picoseconds—is available, time-of-flight calculations are also made in order to add more information regarding the likely position of the annihilation event along the line. A specific characteristic of the isotope (for example, energy of the positron) contributes (via positron range and co-linearity of the two gamma rays) to the determination of the spatial resolution for a specific radiopharmaceutical agent.

The above process is repeated for a large number of annihilation events. While every case needs to be analyzed to determine how many scintillation events are required to support the desired imaging tasks, conventionally, a typical 100 cm long FDG (fluoro-deoxyglucose) study accumulates about 100 million counts or events.

Conventionally, as shown in FIG. 9, detection of an event 900 is performed by a radiation detector, photomultiplier tube (PMT) 902. The PMT 902 has an analog output signal which is filtered by a filter 904 and converted from an analog signal to a digital signal by an analog-to-digital converter (ADC) 906. The filtered and converted signal is then output to a digital signal processing unit 908, which performs event counting and time sampling, executing algorithms for energy, timing, and positions of events. The filter 904 is conventionally designed to operate effectively at a variety of count rates, and conventionally includes an RC filter, as shown in FIG. 10.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

Figure 1:
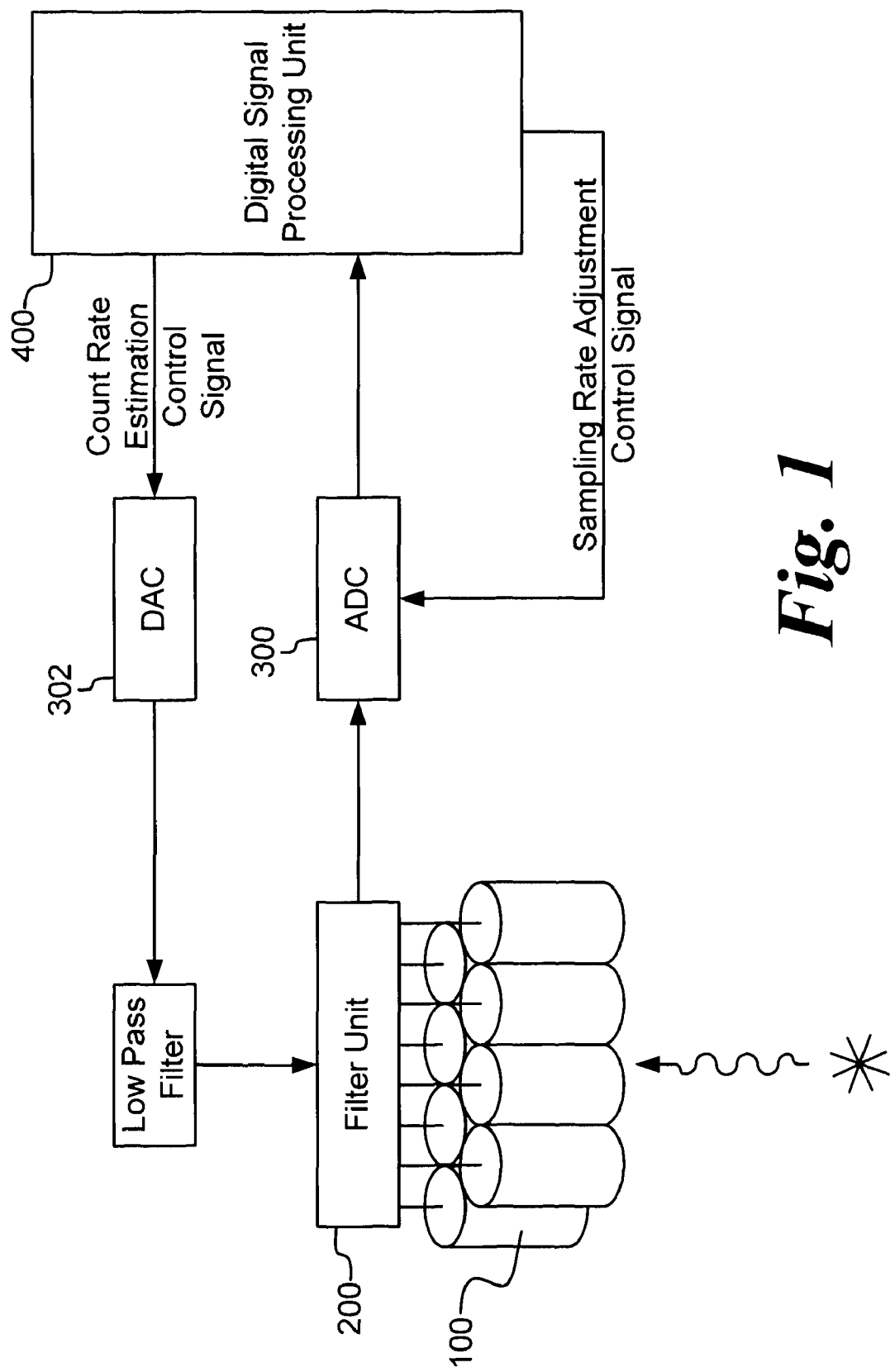
FIG. 1 is a functional block diagram illustrating an adaptive filtering and an adaptive sampling according to an aspect of this disclosure.

This disclosure is directed to devices, systems, algorithms, and processes for radiation detection, and specifically for optimizing a signal-to-noise ratio of measurable energy at a variety of count rates by utilizing adaptive filters and analog-to-digital converters having adaptive sampling rates.

As noted above, conventionally, filters used in radiation detection systems, such as PET systems, for energy information are conventionally optimized for energy resolution characteristics which accommodate a wide range of operating conditions. These filters are conventionally optimized for low count rates. However, such filters are not universally optimized for different count rates, and the conventional optimization starts to degrade due to pile-up effects at high count rates. Aspects of this disclosure are directed to correcting this degradation and efficiently managing resources, and specifically to a feedback system which estimates and monitors a count rate of detected events, detected by a radiation detector, to adaptively adjust filter parameters for optimized performance at different count rates and/or adaptively adjust a sampling rate of an analog-to-digital converter to reduce power usage.

In one embodiment, this disclosure is directed to a device for radiation detection including a rate counter and a controller. The rate counter is configured to estimate, based on a signal filtered by an adjustable filter, a count rate of events detected by the radiation detector. The controller is configured to generate a control signal based on the estimated count rate, and output a control signal to the filter. The control signal causes the filter to adjust the filtering to optimize an energy resolution. Preferably, the device includes the filter configured to filter the signal output from the radiation detector, and the filter includes an adjustable portion to adjust filtering applied to the signal. The filter outputs the filtered signal to the rate counter.

In this aspect, it is preferable the adjustable portion of the filter has an RC time constant that is adjusted by the control signal, and it is further preferable the RC time constant is shortened from an initial value by an amount having a direct relationship with an amount the estimated count rate increases above a threshold value.

In some aspects, the filter includes resistors and capacitors that are switched into and out of operation by the control signal to adjust the RC time constant. In other aspects, the filter includes a voltage-controlled component, including at least one of a voltage-controlled capacitor, a voltage-controlled diode capacitor, and a voltage-controlled resistor. In these aspects, the control signal is a bias voltage that adjusts the voltage-controlled component to adjust the RC time constant of the filter. It is also preferable the filter is a bandwidth-adjustable filter.

In a further aspect, the device includes an analog-to-digital converter (ADC) configured to convert the signal from an analog signal to a digital signal, the ADC having an adjustable sampling rate at which the analog signal is sampled. In this aspect, the controller is further configured to generate a control signal based on the estimated count rate, and output the control signal to the ADC. This control signal causes the ADC to adjust the sampling rate based on the estimated count rate.

In one aspect, the filter is a digital filter, and the ADC converts the signal output from the radiation detector from the analog signal to the digital signal before the filter applies the filtering to the signal. In a further aspect, the device further includes an analog filter configured to filter the analog signal before the analog signal is converted to the digital signal. The analog filter includes an adjustable portion to adjust an analog filtering applied to the analog signal, and the controller is further configured to generate a control signal based on the estimated count rate, and output the control signal to the analog filter. This control signal causes the analog filter to adjust the analog filtering to optimize the energy resolution.

In another aspect, the filter is an analog filter. Here, the ADC converts the signal from the analog signal to the digital signal after the filter applies the filtering to the signal.

In another embodiment, this disclosure is directed to a device for radiation detection including a rate counter configured to estimate, based on a signal converted from an analog signal to a digital signal by an analog-to-digital converter (ADC), a count rate of events detected by a radiation detector, and a controller. The controller is configured to generate a control signal based on the estimated count rate, and output the control signal to the ADC. The control signal causes the ADC to adjust the sampling rate. Preferably, the device also includes the ADC. Here, the ADC has an adjustable sampling rate at which the analog signal is sampled, and outputs the digital signal to the rate counter.

In a further aspect of this embodiment, sampling control signal is generated to reduce the sampling rate of the ADC from an initial value by an amount having a direct relationship with an amount the estimated count rate reduces from a predefined value. Preferably, the initial value is a fastest sampling rate of the ADC.

In a further embodiment, this disclosure is directed to a radiation detection system. The system includes a radiation detector configured to generate an analog signal, as a result of detecting events, and a filter configured to filter the analog signal, the filter including an adjustable portion to adjust filtering applied to the analog signal. The system also includes an analog-to-digital converter (ADC) configured to convert the analog signal to a digital signal, and a digital signal processing unit (DSP). The DSP is configured to (1) estimate, from the digital signal, a count rate of events detected by the radiation detector, (2) generate an analog filtering control signal based on the estimated count rate, and (3) output the analog filtering control signal to the adjustable portion of the filter to adjust the filtering applied to the analog signal so as to optimize an energy resolution.

In a further aspect of this embodiment, the ADC includes an adjustable portion to adjust a sampling rate at which the analog signal is sampled. Here, the digital signal processing unit is further configured to generate a sampling control signal based on the estimated count rate, and to output the sampling control signal to the adjustable portion of the ADC to adjust the sampling rate at which the analog signal is sampled. In another aspect of this embodiment, the radiation detector is one of a photo multiplier tube (PMT), a cadmium telluride (CdTe) based radiation detector, and a silicon photomultiplier (SiPM).

According to another embodiment, this disclosure is directed to a radiation detection method. The method includes receiving a signal output from a radiation detector, the signal being generated by the radiation detector upon detecting an event and filtered by a filter having an adjustable parameter. A count rate of events is estimated, by a rate counter, based on the received signal. Then, based on the estimated count rate, a filtering control signal is generated to adjust the parameter of the filter, and the filtering control signal is transmitted to the filter to optimize an energy resolution.

Preferably, according to this embodiment, the parameter is an RC time constant. Here, the transmitted control signal shortens the RC time constant from an initial value by an amount having a direct relationship with an amount the estimated count rate increases above a predefined threshold value.

Also preferably, the received signal is converted from an analog signal to a digital signal by an analog-to-digital converter (ADC), wherein the ADC has a sampling rate at which the analog signal is sampled. Here, a sampling control signal is also generated, based on the estimated count rate, and transmitted to adjust the sampling rate of the ADC.

According to yet another embodiment, this disclosure is directed to another radiation detection method. This method includes receiving a signal output from a radiation detector, the signal being generated by the radiation detector upon detecting an event and converted from an analog signal to a digital signal by an analog-to-digital (ADC) converter having an adjustable sampling rate. A count rate is estimated by a rate counter based on the received signal. Based on the estimated count rate, a sampling control signal is generated to adjust the sampling rate of the ADC, and the sampling control signal is transmitted to the ADC.

Preferably, in this embodiment, the sampling control signal is generated so as to reduce the sampling rate of the ADC from an initial value by an amount having a direct relationship with an amount the estimated count rate reduces from a predefined value. Further, the initial value is preferably a fastest sampling rate of the ADC.

According to some of the above-noted aspects of this disclosure, the adjustable portion of a filter affects an RC time constant of the filter, and thus the shaping characteristics of an output pulse signal from a radiation detector. In preferred aspects, the filter is a bandwidth-adjustable filter, and can include a combination of low-pass filter, high-pass filter and band-pass filter circuitry, employed in either of an analog or digital filter (or a combination thereof).

In these aspects, the RC time constant is shortened by an amount having a direct relationship with an amount the count rate exceeds a threshold value. In other words, the RC time constant is shortened when the count rate increases. For example, when utilizing a voltage-controlled diode capacitor biased with voltage feedback, the RC time constant shortens when count rate increases as the capacitance of the voltage-controlled diode capacitor reduces with a higher bias voltage. The shorter RC time constant reduces pile-up effects during high count rates, thus yielding better signal-to-noise ratios and optimizing the filter in response to operating conditions, specifically the count rate, to optimize an energy resolution of detected events.

Since the filter is adjustable to respond to operating conditions, the filter is applicable to a wide variety of radiation detectors that produce an electronic output signal. Such detectors include PMTs, cadmium telluride (CdTe) based radiation detectors, and silicon photomultipliers (SiPM). However, aspects of this disclosure are applicable to other radiation detectors as well.

Aspects of an adjustable filter can also be embodied as a digital filter, which receives an analog signal from the radiation detector after being converted to a digital signal by an ADC. Furthermore, aspects of this disclosure are directed to utilizing both an analog filter and a digital filter, wherein one or both of these filters include adjustable portions that are adjusted based on an estimated and monitored count rate.

In the above-noted aspects, the ADC has a sampling rate at which an analog signal is sampled, and includes an input to receive a control signal from a rate counter to adjust the sampling rate based on an estimated count rate. Preferably, the ADC is initially set to an initial value, which can be a fastest sampling rate of the ADC. The sampling rate can then be reduced from the initial value by an amount having a direct relationship with an amount that the count rate reduces from a predefined value. As a result, power savings can be achieved by reducing the sampling rate of the ADC when the count rate does not require the fastest sampling rate.

In preferred aspects of this disclosure, an output of the ADC is connected to a digital signal processing unit (DSP), which in some aspects includes a digital filter with an adjustable portion, as described above. The DSP also preferably includes a rate counter, which estimates a count rate of events detected by the radiation detector.

The DSP includes output circuitry for outputting control signals to adjustable portions of a filter unit including an analog filter and the ADC. These control signals adjust the adjustable portions of these components (i.e., the RC time constant of the analog filter and the sampling rate of the ADC), based on the estimated count rate, to optimize an energy resolution of the radiation detector.

In other aspects, the DSP receives an analog signal that has been filtered by an analog filter, and estimates a rate count based on the received analog filter. Then, the DSP generates a control signal to control an adjustable parameter of the analog filter based on the estimated count rate.

The foregoing paragraphs have been provided by way of general introduction, and are not intended to limit the scope of the following claims. The described embodiments, together with further advantages, will be best understood by reference to the following detailed description taken in conjunction with the accompanying drawings, wherein like reference numerals designate identical or corresponding parts throughout the several views.

FIG. 1 illustrates a functional block diagram of components included in an adaptive filtering and an adaptive sampling procedure according to embodiments disclosed herein. A detector 100 or an array of detectors 100 output detection signals to a filter unit 200. Although each detector 100 can be embodied as a discrete channel having its own filter unit 200, the aspect shown in FIG. 1 includes an eight-channel filter unit. It should be appreciated by those skilled in the art that varying channel usage can be implemented without deviating from the scope of this disclosure.

The output detection signals from the detector 100 (hereinafter referred to as output signals) are electronic pulses resulting from the detector detecting an event (a particle interaction) by receiving radiation therefrom. In radiation detecting, this output pulse is shaped by a filter to remove noise for accurate counting of detected events.

The filter unit 200 applies filtering to the analog output signal of the detector 100 and includes an adjustable portion. The filtering causes shaping of the pulse of the output signal. FIGS. 2A-2D illustrate examples of adaptive filters which can be implemented into the filter unit 200. Although the adaptive filters shown in FIGS. 2A-2D are shown as low-pass filters, it should be appreciated by those skilled in the art that the filter unit 200 can also include high-pass filters and band-pass filters. Preferably, the filter unit 200 incorporates bandwidth adjustable filters, and the filters are adjustable to control integration and differential times thereof continuously in response to an estimated count rate control signal.

Figure 2A:
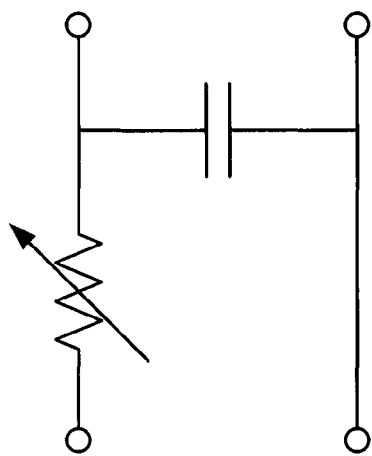
FIGS. 2A-2D illustrate examples of adaptive filters included in the adaptive filter unit shown in FIG. 1.
Figure 2B:
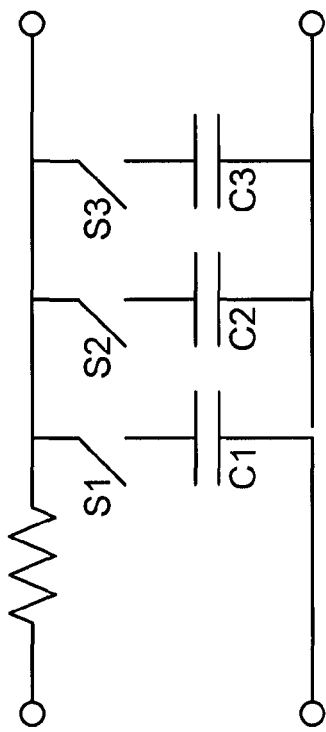
Figure 2C:
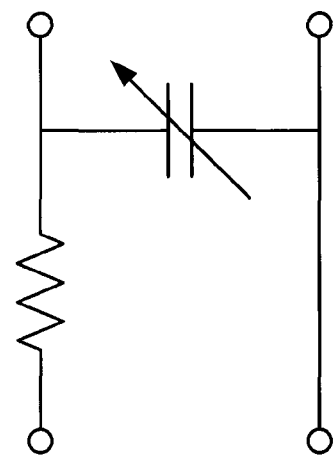
Figure 2D:
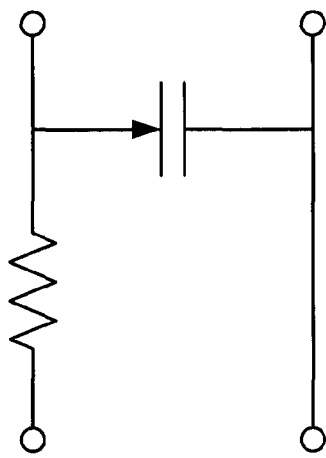

FIG. 2A shows a voltage-controlled capacitor-based low-pass filter, FIG. 2B shows a voltage-controlled resistor-based low-pass filter, and FIG. 2C shows a voltage-controlled diode capacitor-based low-pass filter. The filter unit 200 can also include a switch-controlled filter, as shown in FIG. 2D. Here, various capacitors C1, C2, and C3 are provided in parallel, and can be placed into an operational state by way of switches S1, S2, and S3. The filters shown in FIGS. 2A-2C utilize bias voltages to adjust parameters thereof, thereby adjusting RC time constants thereof. On the other hand, FIG. 2D utilizes a control signal to activate any of switches S1-S3 to vary the RC time constant. It should be appreciated by those skilled in the art that switches can also be provided for a plurality of resistors to vary the RC time constant, and other voltage controlled components can be utilized to vary an RC time constant of a filter.

Referring again to FIG. 1, the output signal from the radiation detector 100, after being filtered by the filter unit 200, is then converted to a digital signal by an analog-to-digital converter (ADC) 300. The ADC 300 has a sampling rate at which the analog signal is sampled, wherein the sampling rate is adjustable by a control signal. The sampling rate is preferably initially set to a maximum or fastest sampling rate of the ADC 300. The resulting digital signal is then processed by a digital signal processing unit (DSP) 400, the structure of which is discussed below.

The DSP 400 outputs control signals to adjust the adjustable portions of the filter unit 200 and the ADC 300. In particular, the digital signal processing unit 400 outputs a count rate estimation control signal to a digital-to-analog converter (DAC) 302, which after passing through a low-pass filter, is input to the filter unit 200. This count rate estimation control signal serves to change the bias voltage, and thus the RC time constant, of an adjustable functional component of the filter unit 200, e.g., as shown in FIGS. 2A-2C. Alternatively, the count rate estimation control signal is a digital control signal for instructing the filter unit 200 to open or close various switches of the filter unit 200 to change the RC time constant of the filtering performed by the filter unit 200, e.g., as shown in FIG. 2D.

The DSP 400 also generates a control signal to cause a sampling rate adjustment at the ADC 300. As note above, the sampling rate (the rate at which the analog output signal from the radiation detector is sampled) is preferably initially set to a maximum or fastest sampling rate of the ADC 300. However, when the count rate falls below a predetermined threshold value, the fastest sampling is not necessary for adequate energy resolution. Accordingly, the DSP 400 adjusts the sampling rate of the ADC 300 to slow the sampling rate by an amount having a direct relationship with an amount the count rate has fallen below a predetermined threshold value, so as to conserve energy usage.

As can be appreciated by those skilled in the art, the above-discussed aspects allow for the filtering of an output signal from a radiation detector and the sampling of that output signal to be adjusted in real-time and continuously as events are detected. Accordingly, degradation due to pile-ups can be avoided while efficiently operating an ADC.

Figure 3:
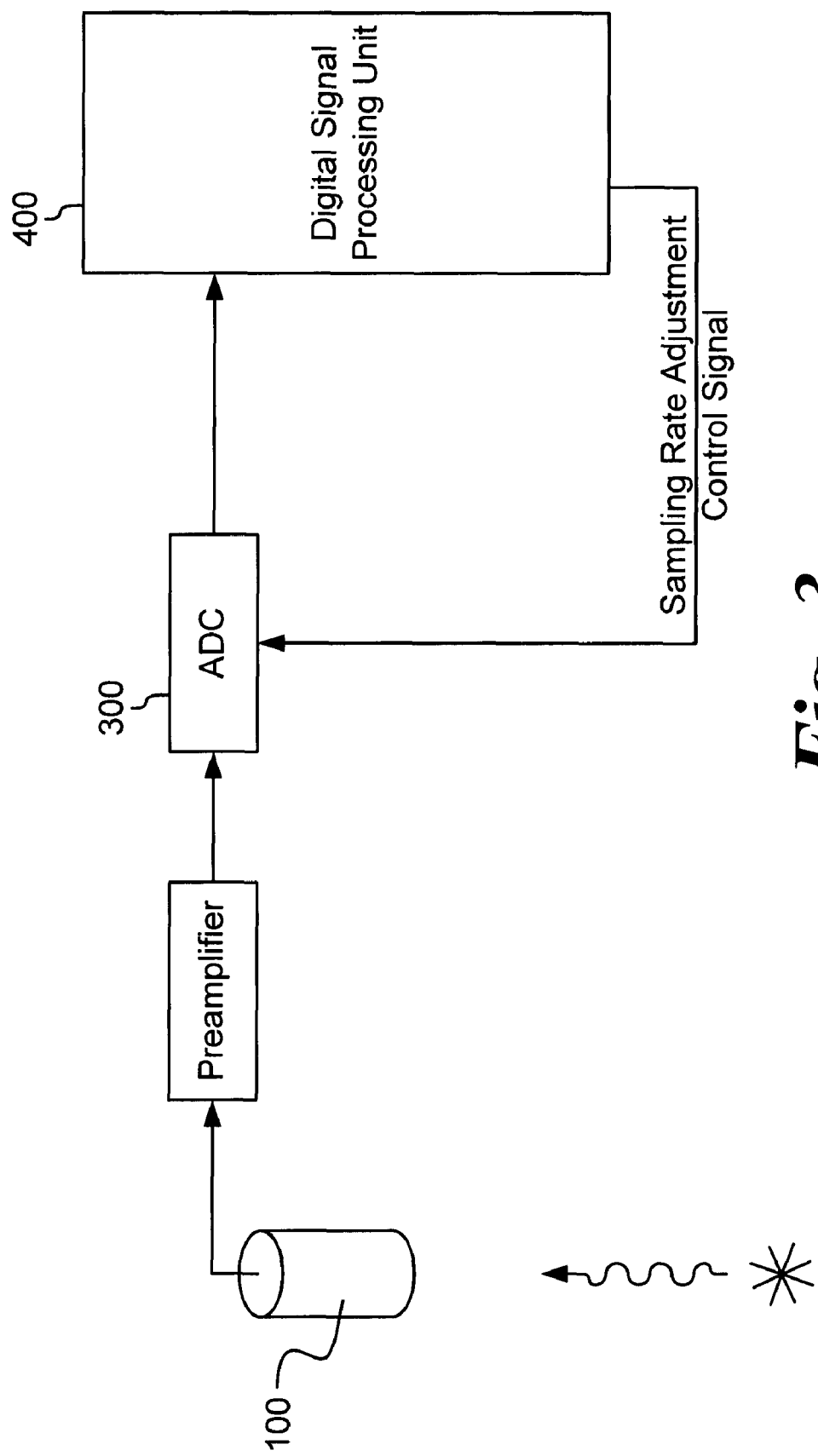
FIG. 3 is a functional block diagram illustrating an adaptive filtering and an adaptive sampling performed by a digital signal processing unit according to another aspect of this disclosure.

In an alternative embodiment, the filtering performed by the filter unit 200 (i.e., the analog filtering) is performed in the digital signal processing unit (DSP) 400 as digital filtering, either as a substitute or in combination. FIG. 3 illustrates this alternative embodiment. Here, the detector 100 outputs an analog signal, through a preamplifier, to an ADC 300, which generates a digital signal to be processed by the DSP 400. The digital signal processing unit 400 internally estimates the count rate and adjusts parameters of the digital filtering performed therein, while also outputting a sampling rate adjustment to the ADC 300, based on the estimated count rate.

As noted above, digital filtering can be performed in addition to analog filtering. Here, adverting back to FIG. 1, the DSP 400 is arranged as shown in FIG. 1, but further includes the digital filter features noted above.

Figure 4:
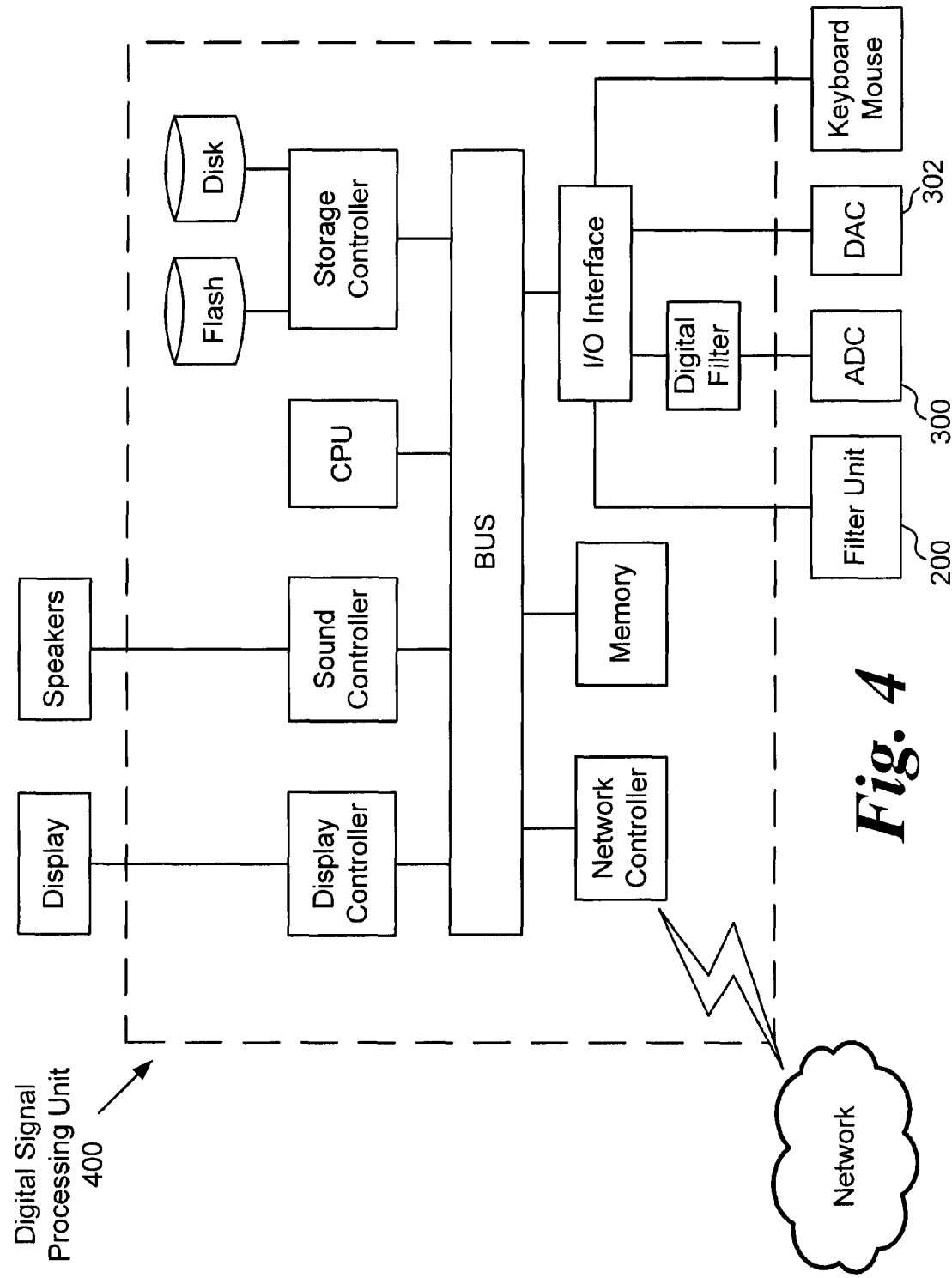
FIG. 4 shows a functional hardware arrangement of a digital signal processing unit according to FIGS. 1 and 3.

Aspects of the above-noted digital filtering, control processing, and generating of signals to adjust an ADC or a filter are preferably implemented utilizing a computer processor. For example, the DSP 400, as shown in FIG. 4, preferably includes a central processing unit (CPU), which can include a plurality of processing cores. As one of ordinary skill in the art would recognize, the CPU can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory, such as a memory connected to the CPU by way of a common BUS as shown in FIG. 4.

In some aspects, the electronic memory is non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU executes computer programs including computer-readable instructions that perform the functions described herein. The program can be stored on various mediums, including any of the above-described non-transitory electronic memories (such as a solid state drive or flash drive) or a disk drive, such as a hard disk, CD or DVD drive. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Signals received by the DSP 400 are processed to obtain an energy value of an event and/or a timing of an event. Timing and energy evaluation information is displayed on a display, such as a LCD display, by way of a display controller. The information can also be stored locally, by a storage controller, to a storage device or transmitted by way of a network controller to networked devices.

In some aspects, the DSP 400 includes special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). Preferably, the DSP 400 includes a discrete digital filter, as shown in FIG. 4, which performs mathematical processes on input signals and includes FPGAs or ASICs. Alternatively, the CPU of the DSP 400 is configured by software to perform digital filtering.

The DSP 400 is preferably embodied in a personal computer and, as noted above, includes a display controller coupled to a display. The DSP 400 also includes an input/output interface for receiving and transmitting signals between the ADC 300, the DAC 302, and the filter unit 200. Preferably, the input/output interface communicates with peripherals for user control of aspects of the DSP 400 by way of a keyboard and mouse. Additionally, a printer (not shown) can be provided.

It should be appreciated that the DSP 400 shown in FIG. 4 is merely exemplary, and one or more processors in a multi-processing arrangement may also be employed to execute sequences of instructions contained in memory. In alternative embodiments, hard-wired circuitry may be used in place of or in combination with software instructions. Thus, embodiments are not limited to any specific combination of hardware circuitry and software.

Software is tangibly stored on computer readable medium of the DSP 400, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, and applications software.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The DSP 400 estimates a count rate based on the pulsed output signals from the radiation detector 100. Generally, counting is performed per channel or per radiation detector 100, and is based on an amplitude threshold. Specifically, when an amplitude of an output signal (pulse) from a radiation detector 100 exceeds a predefined amplitude threshold, a count is made. The DSP 400 then calculates a number of counts per second, which is used as a count rate estimation. It should be appreciated that aspects of this disclosure are not limited to any particular count rate estimation process.

Algorithms and procedures in accordance with the above-noted aspects of adaptive filtering and adaptive sampling are shown in FIGS. 5A-5C and 6. FIG. 5A illustrates an algorithm, by way of a flowchart 500A, of procedures of the systems shown in FIGS. 1 and 3.

Flowchart 500A corresponds to adaptive analog filtering. At S502, events are detected by the radiation detector 100, which results in the radiation detector 100 generating a signal and outputting the signal to the filter unit 200. The filter unit 200 performs analog filtering at S504 based on predefined parameters (i.e., a predefined RC time constant), and this filtered signal is subjected to analog-to-digital conversion at S506 by the ADC 300. The ADC 300 applies sampling according to a predefined sampling rate to generate a digital signal which is transmitted to the DSP 400.

The DSP 400, at S508, performs count rate estimation. Based on the estimated count rate, the DSP 400 adjusts a filtering parameter (i.e., an RC time constant) of the filter unit 200 at S510 by transmitting a corresponding control signal to the filter unit 200. Preferably, at S510, the DSP 400 also adjusts a sampling rate of the ADC 300 by transmitting a corresponding control signal to the ADC 300.

In an alternative embodiment (not shown) of the algorithm shown in flowchart 500A, the ADC 300 is not part of the count rate estimation process. Rather, S508 is performed with a threshold detector, which generates a trigger signal when it detects an event and sends the trigger signal to the DSP 400, which counts the event. Thus, count rate estimation is performed without applying digital filtering and without the ADC 300.

The algorithm illustrated in FIG. 5B in flowchart 500B corresponds to adaptive digital filtering. Here, at S502, events are detected by the radiation detector 100, which results in the radiation detector 100 generating a signal and outputting the signal to the ADC 300. The ADC 300 applies sampling according to a predefined sampling rate to generate a digital signal from the output signal, and outputs the digital signal to the DSP 400. The DSP 400 performs digital filtering at S512 based on predefined parameters (i.e., a predefined RC time constant), and the DSP 400, at S508, performs count rate estimation.

Based on the estimated count rate, the DSP 400 adjusts a filtering parameter (i.e., an RC time constant) of the digital filter at S514 by way of a corresponding control signal. Preferably, at S514, the DSP 400 also adjusts a sampling rate of the ADC 300 by transmitting a corresponding control signal to the ADC 300.

The algorithm illustrated in FIG. 5C in flowchart 500C corresponds to a combination of adaptive analog filtering and adaptive digital filtering. At S502, events are detected by the radiation detector 100 and the radiation detector 100 generates an output signal, which is output to the filter unit 200. The filter unit 200 performs filtering at S504 based on predefined parameters (i.e., a predefined RC time constant), and this filtered signal is subjected to analog-to-digital conversion at S506 by the ADC 300. The ADC 300 applies sampling according to a predefined sampling rate to generate a digital signal which is transmitted to the DSP 400.

The DSP 400 performs digital filtering at S512 based on predefined parameters (i.e., a predefined RC time constant), and the DSP 400, at S508, performs count rate estimation. Based on the estimated count rate, the DSP 400 adjusts a filtering parameter (i.e., an RC time constant) of both the filter unit 200 and the digital filter at S516 by way of corresponding control signals. Preferably, at S516, the DSP 400 also adjusts a sampling rate of the ADC 300 by transmitting a corresponding control signal to the ADC 300.

As discussed above, the sampling rate of the ADC 300 is preferably slowed from a fastest setting thereof by an amount having a direct relationship with an amount the count rate is below a prescribed value. Further, it is preferable the RC time constant of the filter is shortened from a predefined value by an amount having a direct relationship with an amount the count rate exceeds a predefined value. These direct relationships can be linear, exponential, polynomial, or stepwise. However, other direct relationships can be used based on the particular type of radiation detector 100 and other operating conditions.

Figure 5:
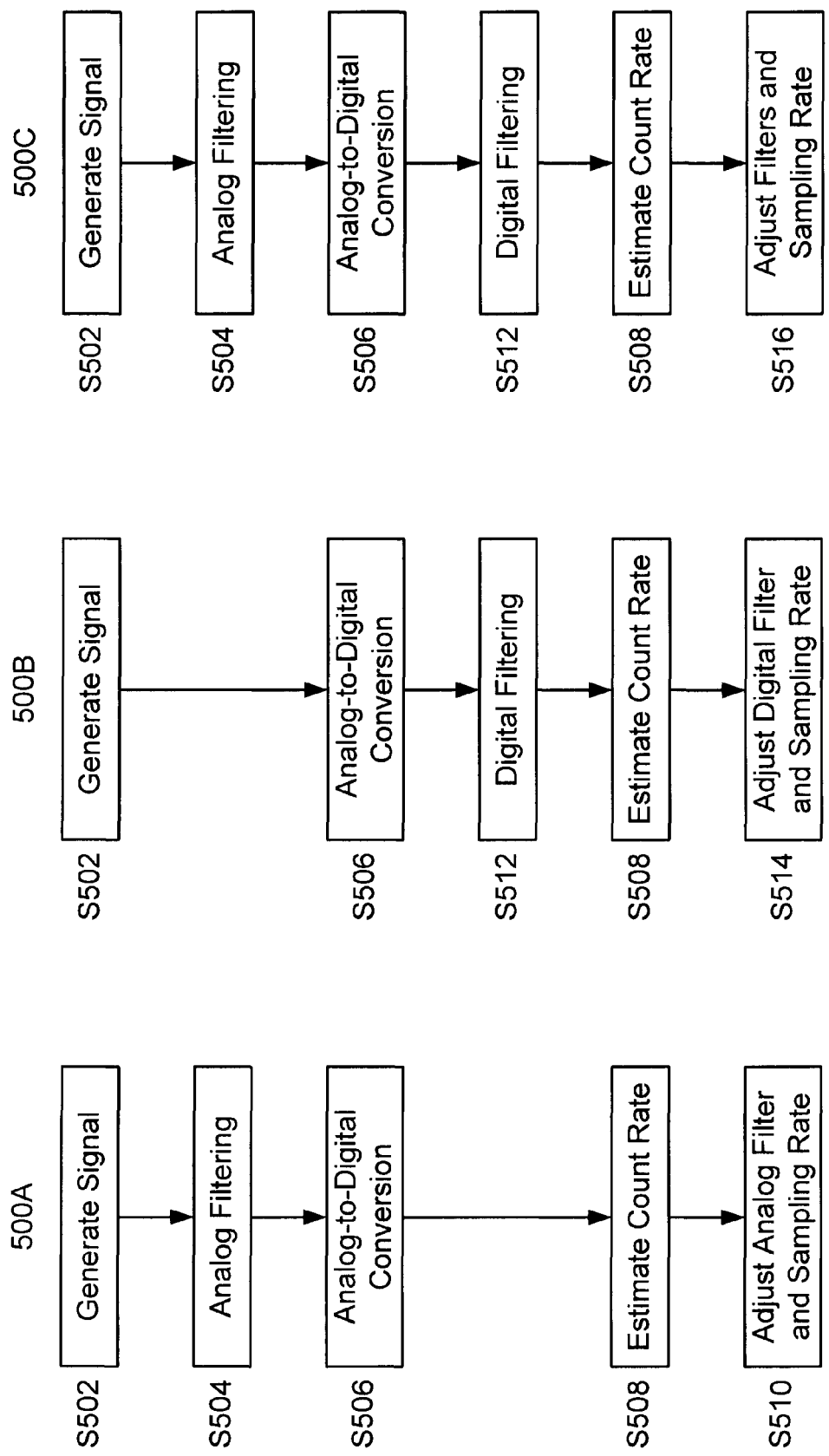
FIGS. 5A-C illustrates algorithms, by way of flowcharts, for adaptive filtering and adaptive sampling according to aspects of this disclosure.

Although the algorithms shown by way of FIG. 5 define adjustments being made to the filters and the sampling rate based on the estimated count rate, it should be appreciated by those skilled in the art that threshold values may be utilized in determining whether to adjust a filter or adjust a sampling rate. For example, upper and lower bound thresholds may be used to define regions of operation (specifically, ranges of count rates) in which the sampling rate of the ADC 300 should and should not be adjusted. Similarly, operational ranges can be predefined for controlling when the analog or digital filters noted above are adjusted. These ranges can be stored in discretized tables of the DSP 400, and compared with actual estimated count rates by the CPU of the DSP 400. Further, a plurality of ranges can be utilized.

Figure 6:
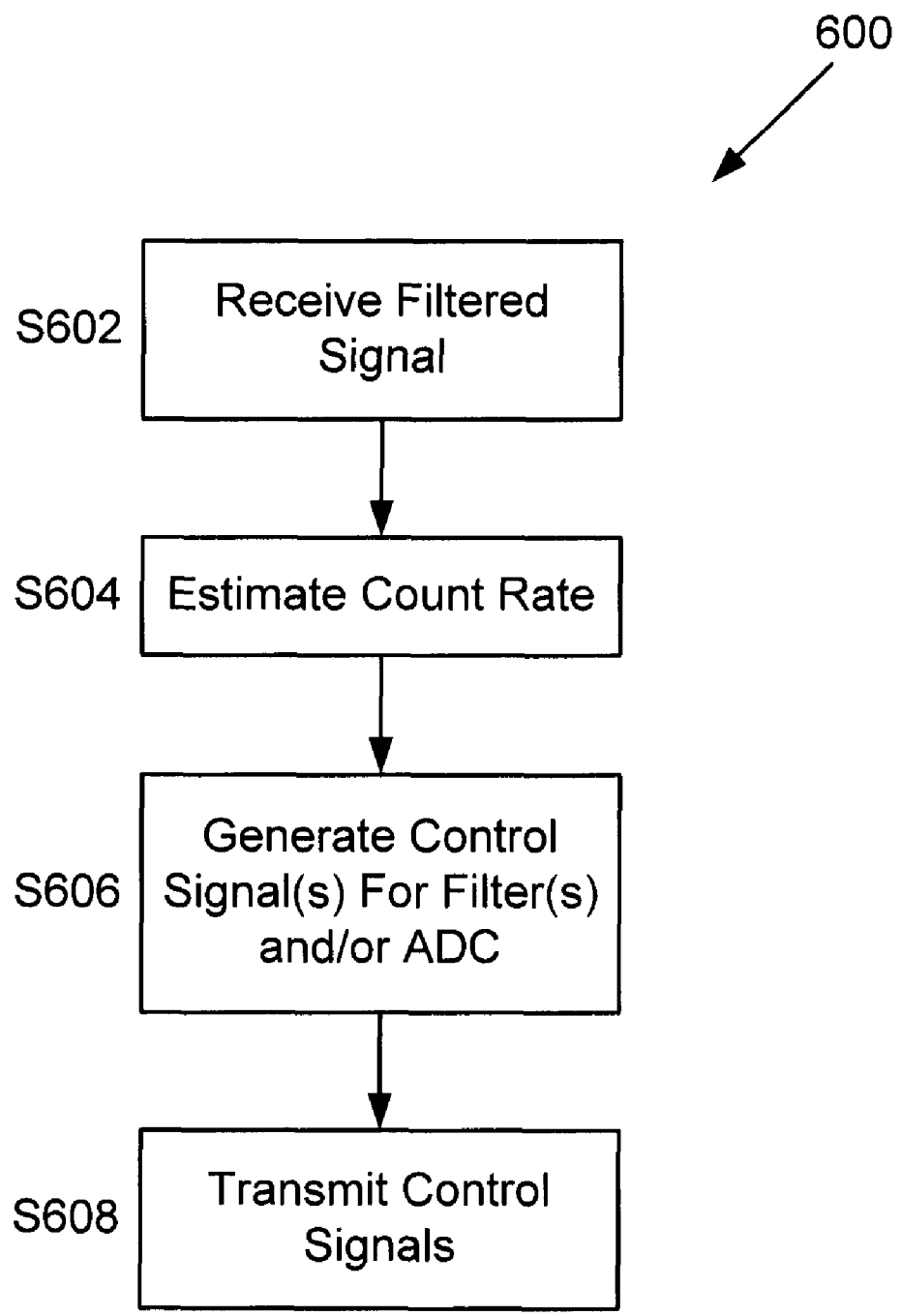
FIG. 6 illustrates algorithms, by way of a flowchart, for processes of transmitting a control signal based on an estimated rate count according to aspects of this disclosure.

FIG. 6 illustrates an algorithm of the DSP 400 by way of a flowchart. At S602, the DSP 400 receives a filtered signal. As discussed above, the filtered signal can be analog filtered, digital filtered, or analog and digital filtered. The DSP 400 then performs count rate estimation at S604.

The signal received by the DSP 400 at S602, in preferred aspects, is a digital signal. However, this is not necessary, but merely preferred. The signal received by the DSP 400 at S602 can also be an analog signal. Accordingly, in this embodiment, the ADC 300 shown in FIG. 1 is not utilized in the count rate estimation process and the DSP 400 performs count rate estimation in an analog domain only. That is, the DSP 400 will estimate a count rate of events detected by the radiation detector 100 at S604 by utilizing an analog signal from the radiation detector 100. For example, the analog signal can be compared to a predefined threshold amplitude value identifying an event.

After estimating the count rate at S604 from a received analog signal or a received digital signal, the DSP 400 determines control signals at S606 for transmission to the above-discussed analog and digital filters to control parameters thereof, based on the estimated count rate. The DSP 400 then transmits the control signals at S608 to respective analog filters (such as the filter unit 200), digital filters (such as the digital filter of the DSP 400), and analog-to-digital converters (such as the ADC 300), as appropriate. This algorithm is continuous with the detection of events, and is thus responsive to the output signals from the radiation detector 100.

As discussed above, an alternative embodiment excludes the above-described ADC 300 from the count rate estimation process of the DSP 400. Examples are shown in FIGS. 7 and 8, which illustrate modified arrangements of those shown in FIGS. 1 and 3, respectively.

Figure 7:
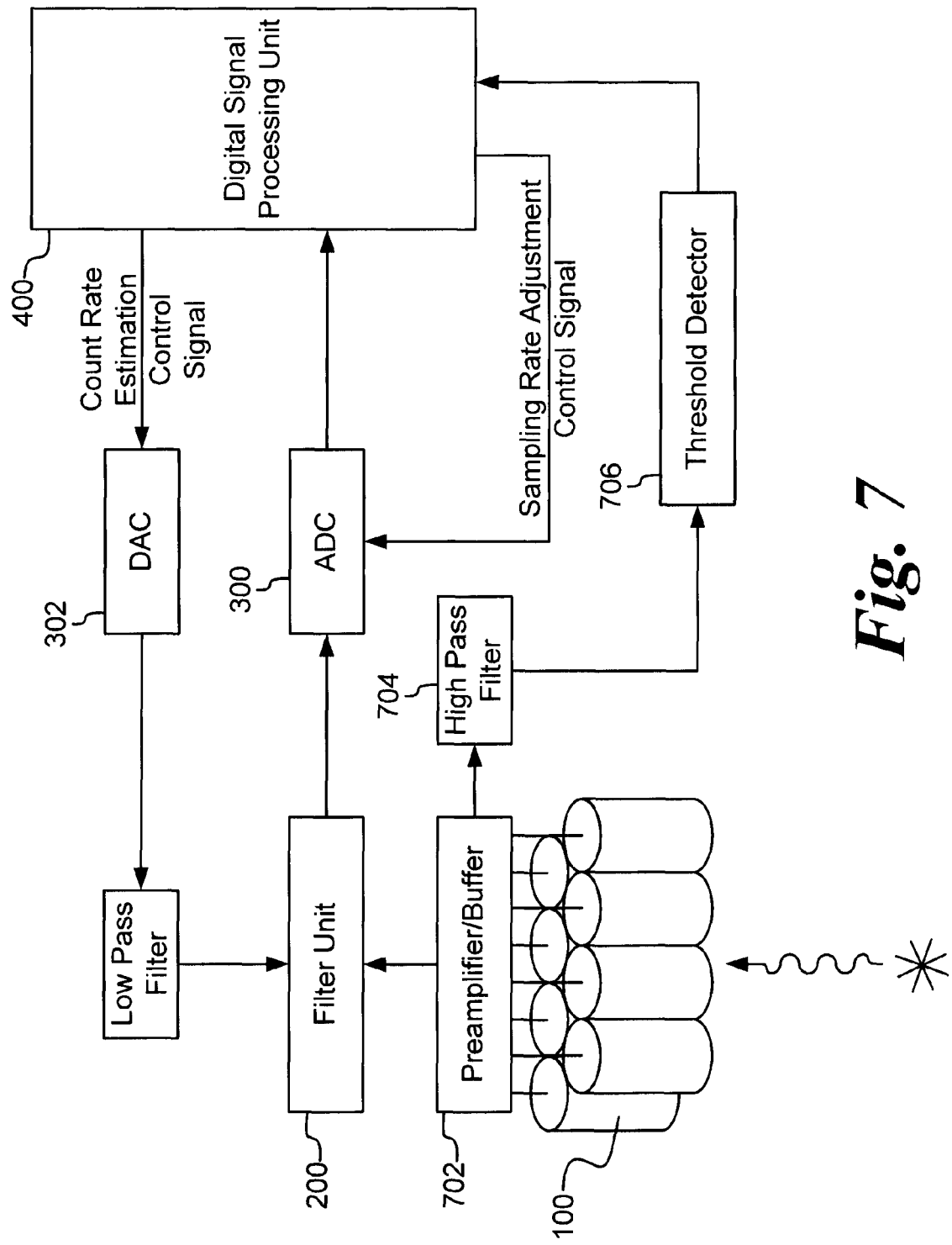
FIG. 7 illustrates a modified aspect of the functional block diagram shown in FIG. 1.

In FIG. 7, the radiation detector 100 outputs signals to a preamplifier/buffer 702, which in turn outputs an analog signal to the filter unit 200, discussed above, and separately to a high-pass filter 704. The high-pass filter 704 outputs a filtered signal to a threshold detector 706, which detects an event and outputs a trigger signal to the DSP 400. As a result of this arrangement, the DSP 400 estimates the count rate without utilizing the ADC 300, but can still perform the above-described control operations of outputting the count rate estimation control signal to the filter unit 200 and outputting the sampling rate adjustment control signal to the ADC 300.

Figure 8:
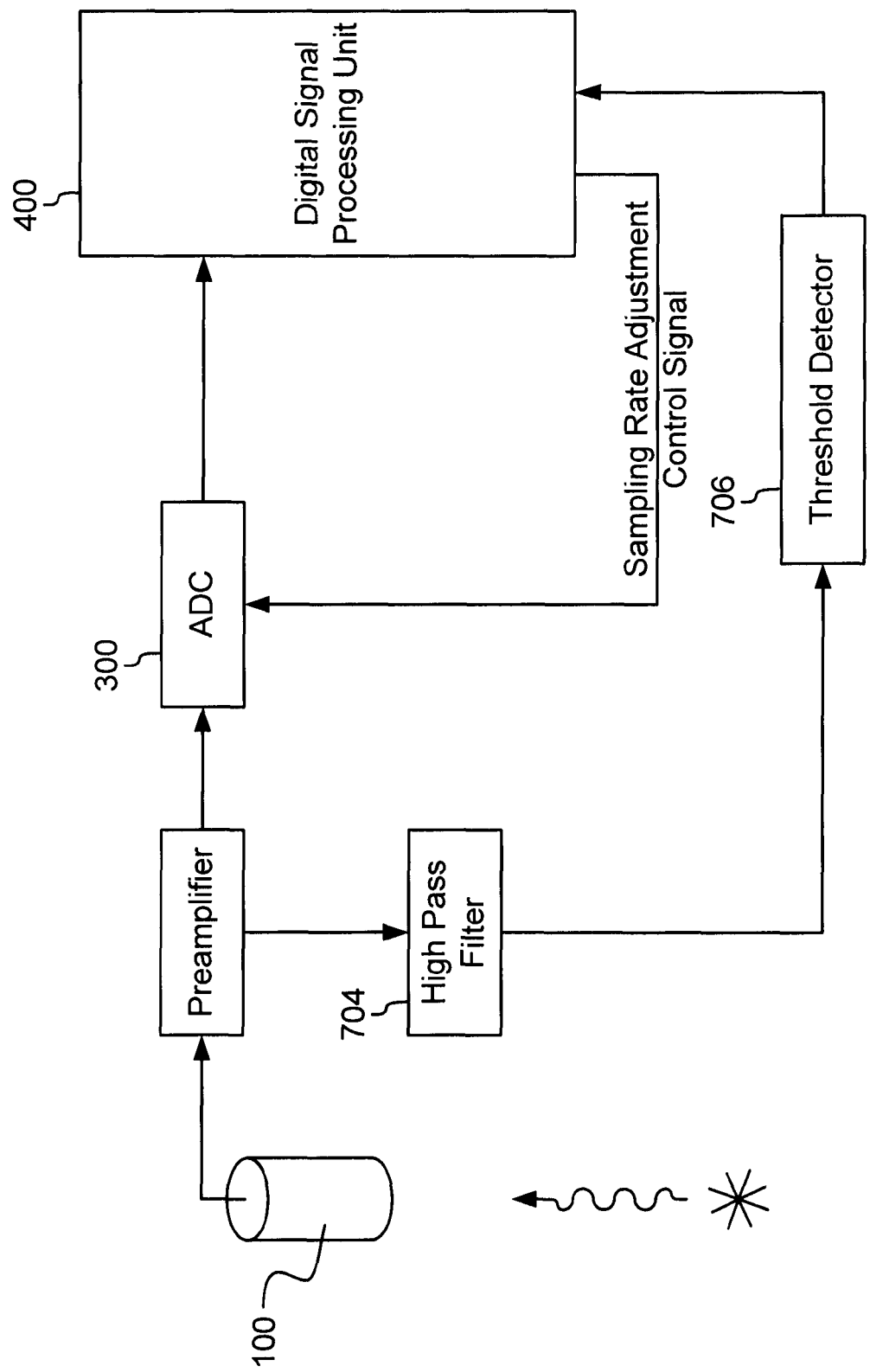
FIG. 8 illustrates a modified aspect of the functional block diagram shown in FIG. 3.
Figure 9:
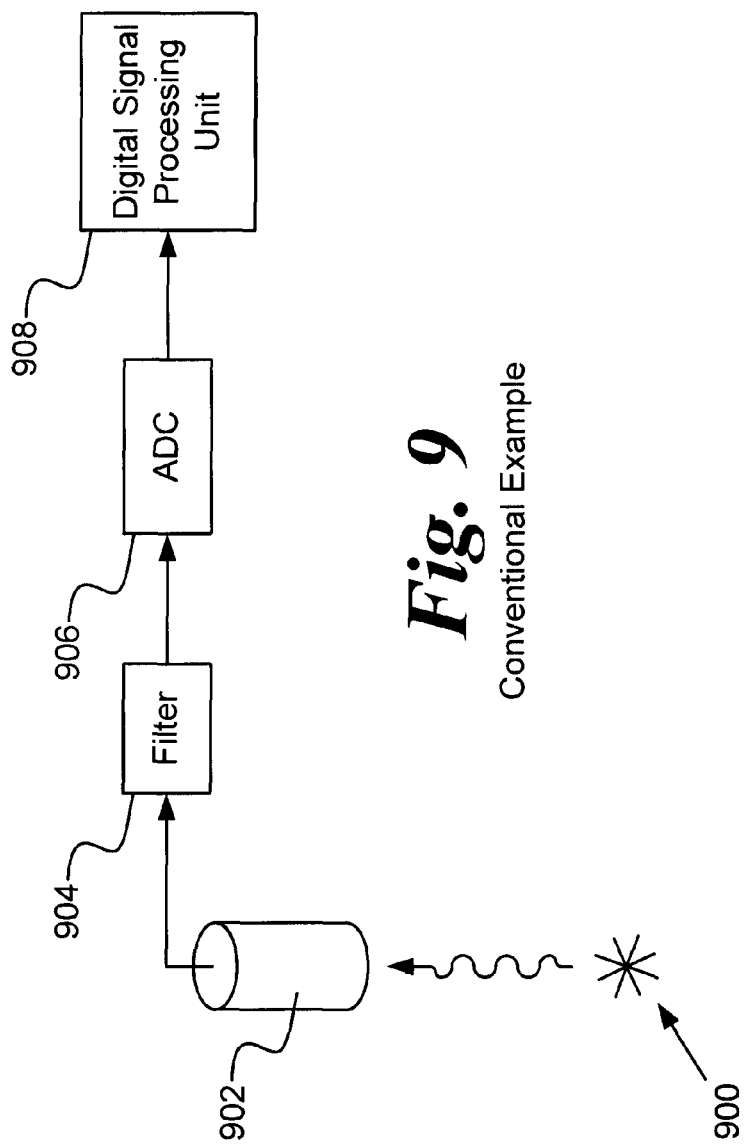
FIG. 9 is a functional block diagram showing a conventional PET system.
Figure 10:
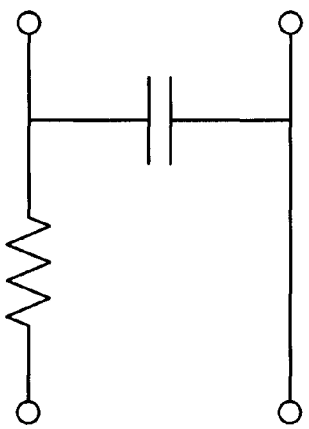
FIG. 10 illustrates a conventional filter for the conventional PET system shown in FIG. 9.

In FIG. 8, the embodiment shown in FIG. 3 is modified to include the high-pass filter 704 connected to the preamplifier, where the threshold detector 706 detects an event and outputs a trigger signal to the DSP 400. Accordingly the count rate estimation process can be performed by the DSP 400, without utilizing the output from the ADC 300, while still performing control of the ADC 300 by the sampling rate adjustment control signal output from the DSP 400.

While certain embodiments have been described, these embodiments have been presented by way of example only, and are not intended to limit the scope of this disclosure. Indeed the novel devices, systems and methods described herein may be embodied in a variety of other forms; furthermore, various omissions, substitutions, and changes in the form of the devices, systems and methods described herein may be made without departing from the spirit of this disclosure. The accompanying claims and their equivalents are intended to cover such forms or modifications as would fall within the scope and spirit of this disclosure.

The invention claimed is:

1. A device for radiation detection, comprising:
   a rate counter configured to estimate, based on a signal which is filtered by an adjustable filter configured to perform filtering, a count rate of events detected by a radiation detector; and
   a controller configured to generate a filtering control signal based on the estimated count rate, and to output the filtering control signal to the filter, the filtering control signal causing the filter to adjust the filtering to optimize an energy resolution.

2. The device according to claim 1, further comprising:
   the filter configured to perform the filtering to a signal output from the radiation detector, the filter including an analog adjustable portion to adjust the filtering, wherein the filter is an analog filter and the analog adjustable portion of the filter has an RC time constant that is adjusted by the filtering control signal.

3. The device according to claim 2, wherein the RC time constant is shortened from an initial value by an amount having a direct relationship with an amount the estimated count rate increases above a threshold value.

4. The device according to claim 2, wherein the filter includes a resistor or a capacitor that is switched into and out of operation by the filtering control signal to adjust the RC time constant.

5. The device according to claim 2, wherein:
   the filter includes a voltage-controlled component, including at least one of a voltage-controlled capacitor, a voltage-controlled diode capacitor, and a voltage-controlled resistor; and
   the filtering control signal is a bias voltage that adjusts the voltage-controlled component to adjust the RC time constant of the filter.

6. The device according to claim 2, wherein the filter is a bandwidth-adjustable filter.

7. The device according to claim 2, further comprising:
   an analog-to-digital converter (ADC) configured to convert the signal output from the filter from an analog signal to a digital signal, the ADC having an adjustable sampling rate at which the analog signal is sampled, and to output the digital signal to the rate counter, wherein
   the controller is further configured to generate a sampling control signal based on the estimated count rate, and to output the sampling control signal to the ADC, the sampling control signal causing the ADC to adjust the sampling rate based on the estimated count rate.

8. The device according to claim 1, further comprising:
   the filter configured to perform the filtering, wherein the filter is a digital filter and includes a digital adjustable portion to adjust the filtering, and
   the digital adjustable portion is adjusted by the filtering control signal.

9. The device according to claim 8, further comprising:
   an analog-to-digital converter (ADC) configured to convert a signal output from the radiation detector from an analog signal to a digital signal, the ADC having an adjustable sampling rate at which the analog signal is sampled, and to output the digital signal to the digital filter, wherein
   the controller is further configured to generate a sampling control signal based on the estimated count rate, and to output the sampling control signal to the ADC, the sampling control signal causing the ADC to adjust the sampling rate based on the estimated count rate.

10. The device according to claim 9, further comprising:
    an analog filter configured to filter the signal output from the radiation detector before the ADC converts the analog signal to the digital signal, the analog filter including an analog adjustable portion to adjust an analog filtering applied to the analog signal, wherein
    the controller is further configured to generate an analog filtering control signal based on the estimated count rate, and to output the analog filtering control signal to the analog filter, the analog filtering control signal causing the analog filter to adjust the analog filtering to optimize the energy resolution.

11. A device for radiation detection, comprising:
    a rate counter configured to estimate, based on a signal converted from an analog signal to a digital signal by an analog-to-digital converter (ADC), a count rate of events detected by a radiation detector; and
    a controller configured to generate a sampling control signal based on the estimated count rate, and to output the sampling control signal to the ADC, the sampling control signal causing the ADC to adjust an adjustable sampling rate of the ADC.

12. The device according to claim 11, further comprising:
    the ADC configured to convert the analog signal to the digital signal, the ADC further configured to output the digital signal.

13. The device according to claim 12, wherein the controller is configured to generate the sampling control signal to reduce the sampling rate of the ADC from an initial value by an amount having a direct relationship with an amount the estimated count rate reduces from a predefined value.

14. The device according to claim 13, wherein the initial value is a fastest sampling rate of the ADC.

15. A radiation detection system, comprising:
    a radiation detector configured to generate an analog signal;
    an analog filter configured to filter the analog signal, the analog filter including an analog adjustable portion to adjust filtering applied to the analog signal;
    an analog-to-digital converter (ADC) configured to convert the filtered analog signal to a digital signal; and
    a digital signal processing unit configured to (1) estimate, from the digital signal, a count rate of events detected by the radiation detector, (2) generate an analog filtering control signal based on the estimated count rate, and (3) output the analog filtering control signal to the analog adjustable portion of the analog filter to adjust the filtering applied to the analog signal so as to optimize an energy resolution.

16. The radiation detection system according to claim 15, wherein:
    the ADC includes an adjustable sampling portion to adjust a sampling rate at which the analog signal is sampled; and the digital signal processing unit is further configured to generate a sampling control signal based on the estimated count rate, and to output the sampling control signal to the adjustable sampling portion of the ADC to adjust the sampling rate at which the analog signal is sampled.

17. The radiation detection system according to claim 15, wherein the radiation detector is one of a photomultiplier tube (PMT), a cadmium telluride (CdTe) based radiation detector, and a silicon photomultiplier (SiPM).

18. A radiation detection method, comprising:

estimating, by a rate counter, a count rate of events detected by a radiation detector based on a signal which has been filtered by a filter having an adjustable parameter;

generating, based on the estimated count rate, a filtering control signal to adjust the parameter of the filter; and transmitting the filtering control signal to the filter to optimize an energy resolution.

19. The method according to claim 18, wherein:

the parameter is an RC time constant; and the generating step includes generating the filtering control signal so as to shorten the RC time constant from an initial value by an amount having a direct relationship with an amount the estimated count rate increases above a threshold value.

20. The method according to claim 19, further comprising:

converting the filtered signal from an analog signal to a digital signal by an analog-to-digital converter (ADC), the ADC having a sampling rate at which the analog signal is sampled;

generating, based on the estimated count rate, a sampling control signal to adjust the sampling rate of the ADC; and transmitting the sampling control signal to the ADC.

21. A radiation detection method, comprising:

estimating, by a rate counter, a count rate of events detected by a radiation detector based on a signal which has been converted from an analog signal to a digital signal by an analog-to-digital (ADC) converter having an adjustable sampling rate;

generating, based on the estimated count rate, a sampling control signal to adjust the sampling rate of the ADC; and transmitting the sampling control signal to the ADC.

22. The method according to claim 21, wherein the generating step includes generating the sampling control signal so as to reduce the sampling rate of the ADC from an initial value by an amount having a direct relationship with an amount the estimated count rate reduces from a predefined value.

23. The method according to claim 22, wherein the initial value is a fastest sampling rate of the ADC.

* * * * *